US007460603B2

(12) United States Patent
Chen et al.

(10) Patent No.: US 7,460,603 B2
(45) Date of Patent: Dec. 2, 2008

(54) SIGNAL INTERFACE

(75) Inventors: Jung-Zone Chen, Hsinhua (TW); Tsung-Yu Wu, Hsinhua (TW); Ying-Lieh Chen, Hsinhua (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 704 days.

(21) Appl. No.: 11/168,677

(22) Filed: Jun. 28, 2005

(65) Prior Publication Data

US 2006/0291573 A1 Dec. 28, 2006

(51) Int. Cl.
*H04B 3/00* (2006.01)

(52) U.S. Cl. ....................................... 375/257; 375/220

(58) Field of Classification Search ................. 375/220, 375/257–258, 318, 377; 327/128; 326/30, 326/82–83, 86
See application file for complete search history.

(56) References Cited

U.S. PATENT DOCUMENTS 6,448,813 B2 * 9/2002 Garlepp et al. ................ 326/83
6,683,472 B2 * 1/2004 Best et al. ..................... 326/30
6,788,101 B1 * 9/2004 Rahman ...................... 326/30
6,856,178 B1 * 2/2005 Narayan ..................... 327/108

* cited by examiner

*Primary Examiner*—Khanh C Tran
(74) *Attorney, Agent, or Firm*—Thomas, Kayden, Horstemeyer & Risley

(57) ABSTRACT

The present invention discloses a signal interface to transmit a data signal to a driving circuit. The signal interface comprises a first circuit, a second circuit and a data bus. The first circuit comprises a first register. The second circuit comprises a selector, a second register, a receiver and a third register. If the data signal is a single-end signal, the first register and the selector receive the data signal. Then, the selector transmits the data signal to the second register. The data bus transmits the signal saved in the first register and the second register to the driving circuit. If the data signal is a serial signal, the selector receives and transmits the data signal to the receiver to have it transferred to a single-end signal. Then, the signal is transmitted to the third register and output via the data bus.

29 Claims, 5 Drawing Sheets

SIGNAL INTERFACE

FIELD OF THE INVENTION

The present invention relates to a signal interface, and more particularly, to a signal interface set in the front of a driving circuit that can transmit a single-end signal or differential signal to the driving circuit.

BACKGROUND OF THE INVENTION

Recently, liquid crystal displays (LCD) have been widely applied in electrical products due to the rapid progress of optical technology and semiconductor technology. Moreover, with advantages of high image quality, compact size, light weight, low driving voltage and low power consumption, LCDs have been introduced into portable computers, personal digital assistants and color televisions, and have become the mainstream display apparatus.

In liquid crystal displays, a source driver is used to convert a digital signal to an analog voltage to transmit the image signal to the display; thus, the source driver is also called the data driver. It can receive a signal from a timing controller which may be a single-end signal or a serial signal. The single-end signal may be a transistor-transistor logic (TTL) signal, and the serial signal may be a reduced swing differential signal (RSDS) or a low voltage differential signal (LVDS).

Generally, the conventional source driver transmits only one kind of signal, either the transistor-transistor logic signal or the reduced swing differential signal. Therefore, the transistor-transistor logic signal and the reduced swing differential signal sent from the timing controller require different kinds of source driver. That is, these two kinds of signals cannot use the same source driver. In making source driver circuit boards, different source driver circuits need to be formed according to the different kinds of signals needed. Consequently, manufacturing is complicated and slow due to having to prepare many materials and allocate multiple production lines.

SUMMARY OF THE INVENTION

Therefore, one objective of the present invention is to provide a signal interface to transmit a single-end signal or a serial signal to a driving circuit.

Another objective of the present invention is to provide a signal interface with a transistor-transistor logic signal receiving circuit and a transistor-transistor logic signal/reduced swing differential signal receiving circuit for receiving a transistor-transistor logic signal and a reduced swing differential signal.

Still another objective of the present invention is to provide a signal interface set in the front of a driving circuit which makes the driving circuit receive a transistor-transistor logic signal and a reduced swing differential signal, and further reduces manufacturing complexity.

Still another objective of the present invention is to provide a signal interface in which a transistor-transistor logic signal/reduced swing differential signal receiving circuit not only can receive a reduced swing differential signal but can also work with a transistor-transistor logic signal receiving circuit to receive a transistor-transistor logic signal. Therefore, the pins of the signal interface can be commonly used to receive signals and there is no need to design for other kinds of signals.

According to the aforementioned objectives, the present invention provides a signal interface, suitable for transmitting a data signal to a driving circuit. The signal interface comprises at least a first circuit, at least a second circuit and at least a data bus. The first circuit comprises a first register. The second circuit comprises a selector, a second register, a receiver and a third register. The selector receives the data signal. The second register and the receiver are electrically connected to the selector. The third register is electrically connected to the receiver. The data bus is electrically connected to the first register, the second register and the third register. The data bus transmits the signal output from the first register, the second register and the third register to the driving circuit.

If the data signal is a first single-end signal, the first register and the selector receives the data signal. The selector further transmits the data signal to the second register to make the data bus transmit the signal saved in the first register and the second register to the driving circuit. If the data signal is a serial signal, the selector receives and transmits the data signal to the receiver to have the data signal transferred to a second single-end signal and transmitted to the third register and then output to the driving circuit via the data bus.

According to the preferred embodiment of the present invention, the selector is a de-multiplexer. The first single-end signal and the second single-end signal are transistor-transistor logic signals, and the serial signal is a differential signal. The third register is a two-stage register used for converting the second single-end signal from serial-in to parallel-out.

According to the preferred embodiment of the present invention, the signal interface further comprises a data-sorting circuit coupled between the third register and the data bus or coupled between the data bus and the driving circuit.

According to another objective, the present invention provides a signal receiving circuit comprising a selector, a first register, a differential signal receiver and a second register. The selector receives a data signal wherein the data signal is a first single-end signal or a differential signal. The first register, electrically connected to the selector, registers and outputs the first single-end signal. The differential signal receiver, electrically connected to the selector, converts the differential signal to a second single-end signal. The second register, electrically connected to the differential signal receiver, registers and outputs the second single-end signal.

According to the preferred embodiment of the present invention, the signal receiving circuit further couples to a data bus to form a signal interface to transmit the data signal to a driving circuit via the data bus. In the preferred embodiment of the present invention, the selector is a de-multiplexer. The first single-end signal and the second single-end signal are transistor-transistor logic signals, and the differential signal is a reduced swing differential signal. The second register is a two-stage register used for converting the second single-end signal from serial-in to parallel-out.

According to the preferred embodiment of the present invention, the signal receiving circuit further comprises a data-sorting circuit coupled to the second register or coupled between the data bus and the driving circuit.

According to the objectives, the present invention provides an operation method of a signal interface comprising the following steps. First, a data signal is received, wherein the data signal is a first single-end signal or a first differential signal. Then, if the data signal is the first single-end signal, the first single-end signal is sent to a first register and output. If the data signal is the first differential signal, the first differential signal is converted to a second single-end signal and sent to a second register. Then, a second differential signal is input and converted to a third single-end signal. Afterwards, the third single-end signal is sent to the second register, the second single-end signal and the third single-end signal are output.

According to the preferred embodiment of the present invention, the step of sending the second single-end signal to the second register is to send the second single-end signal to a first stage register of the second register. The preferred embodiment of the present invention further comprises sending the second single-end signal in the first stage register to a second stage register of the second register before the step of sending the third single-end signal to the second register. The step of sending the third single-end signal to the second register is to send the third single-end signal to the first stage register of the second register. The first single-end signal, the second single-end signal and the third single-end signal are transistor-transistor logic signals. The first differential signal and the second differential signal are reduced swing differential signals. The preferred embodiment of the present invention further comprises the step of sorting the data signal wherein the data signal is the first single-end signal, the second single-end signal or the third single-end signal.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

In order to make the illustration of the present invention more explicit and complete, the following description is stated with reference to FIGS. 1 through 4.

Figure 1:
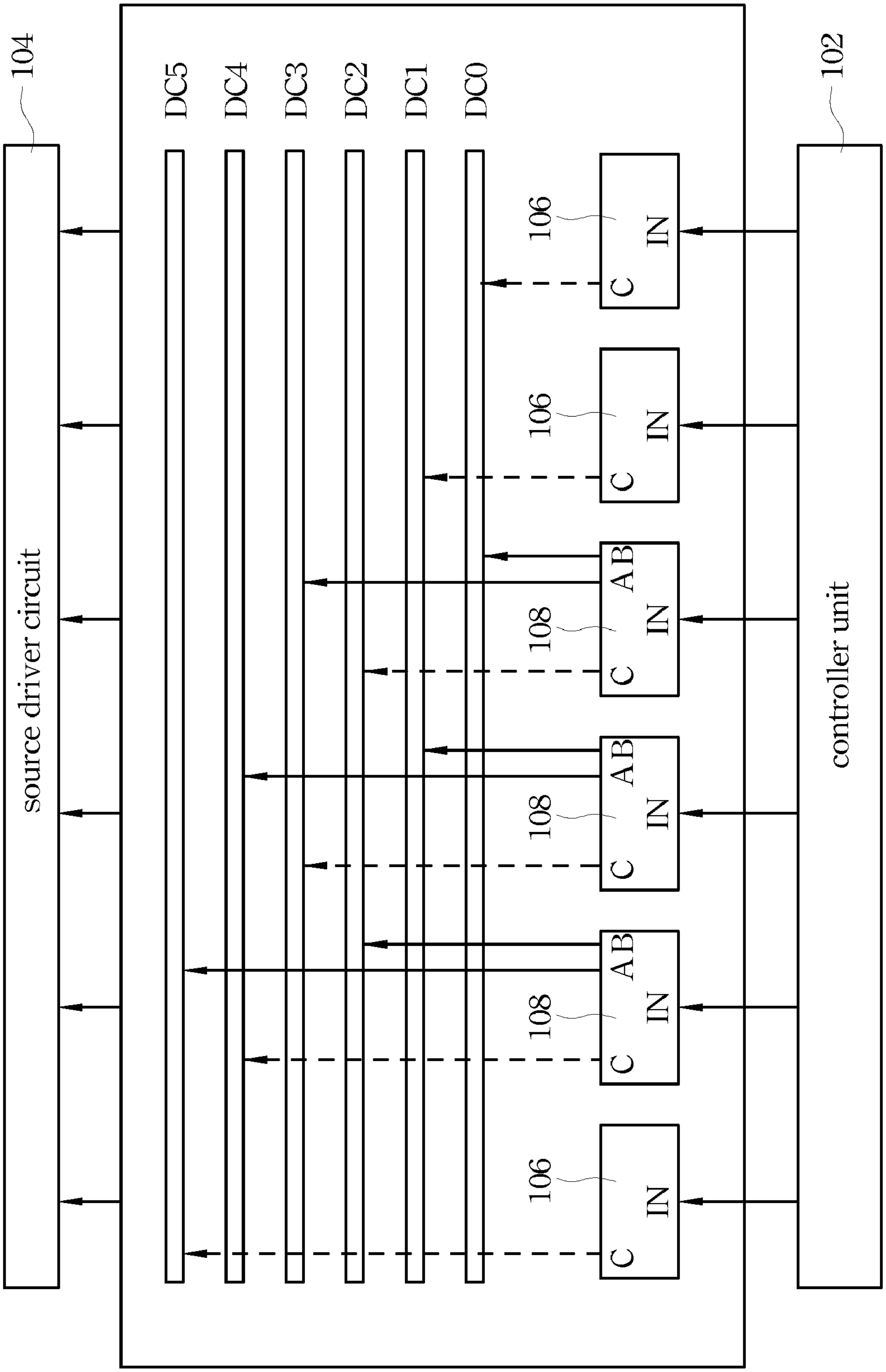
FIG. 1 illustrates a signal interface according to the preferred embodiment of the present invention.

Reference is made to FIG. 1 illustrating a signal interface according to the preferred embodiment of the present invention. The signal interface in the preferred embodiment of the present invention can transmit a single-end signal or a differential signal sent from a controller unit 102 to a source driver circuit 104. In the preferred embodiment of the present invention, the single-end signal is represented by a transistor-transistor logic signal (TTL signal hereafter), and a differential signal is represented by a reduced swing differential signal (RSDS signal hereafter). As shown in FIG. 1, the signal interface in the preferred embodiment of the present invention includes three TTL signal receiving circuits 106 and three TTL/RSDS signal receiving circuits 108 to receive TTL signals and RSDS signals. Since the RSDS signal is a serial signal and the TTL signal is a parallel signal, the number of receiving circuits of the TTL signals needed in data transmitting is greater than that of the RSDS signals. Therefore, the TTL signal receiving circuit 106 and the TTL/RSDS signal receiving circuit 108 need to work together to receive the TTL signals. In contrast, when transmitting the RSDS signals, only the TTL/RSDS signal receiving circuit 108 is necessary.

As shown in FIG. 1, when the data signal sent from the controller unit 102 is the TTL signal, the TTL signal receiving circuits 106 and the TTL/RSDS signal receiving circuits 108 work together to receive six sets of data simultaneously and then transmit the data to the data bus (denoted as DC0, DC1, DC2, DC3, DC4 and DC5) at the same time, as the dotted lines show in FIG. 1. The data further output to the source driver circuit 104 electrically connected to the signal interface of the present invention. Alternatively, when the data signal sent from the controller unit 102 is the RSDS signal, the TTL/RSDS signal receiving circuits 108 receive the six sets of data at two times and then transmit the six sets of data to the data bus simultaneously, as the solid lines show in FIG. 1, to output the data to the source driver circuit 104 electrically connected to the signal interface of the present invention.

Figure 2A:
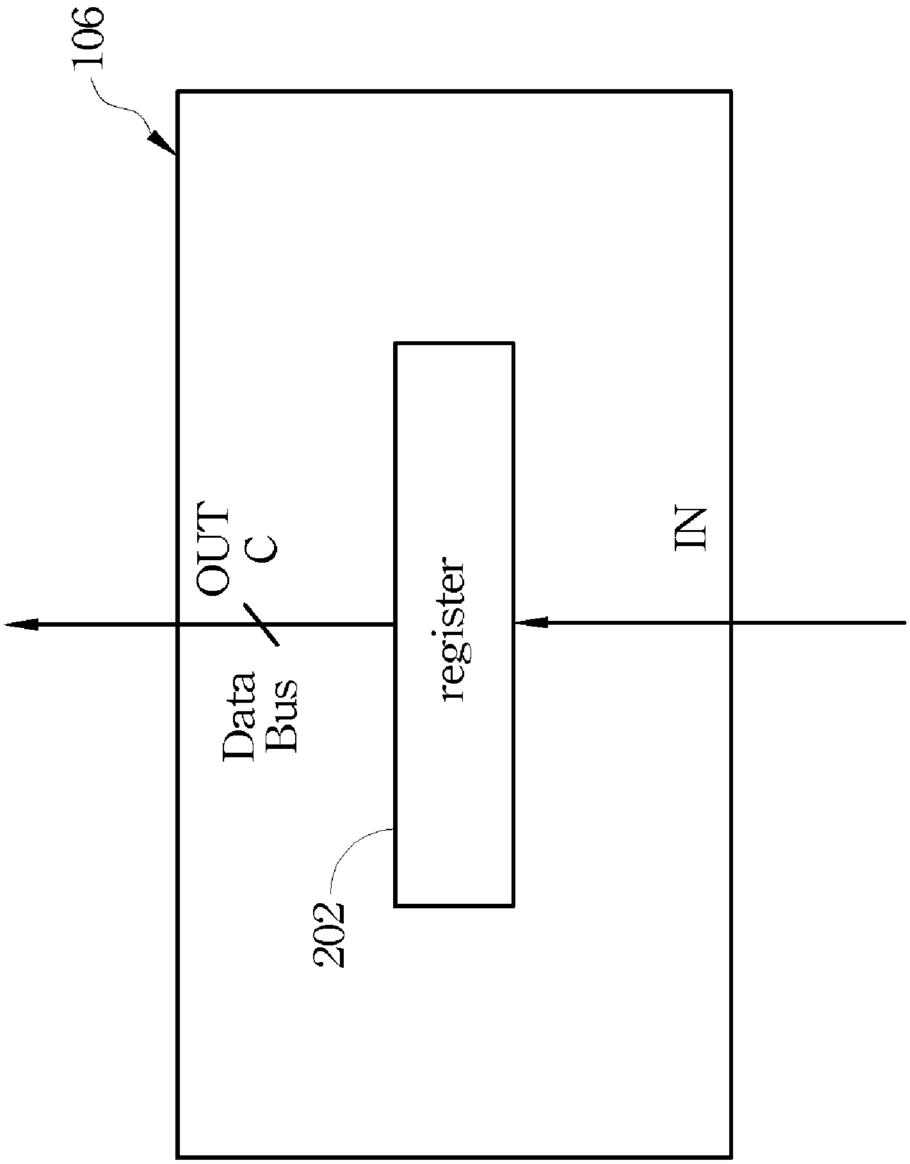
FIG. 2*a* illustrates the block diagram of a TTL signal receiving circuit of a signal interface according to the preferred embodiment of the present invention.
Figure 2B:
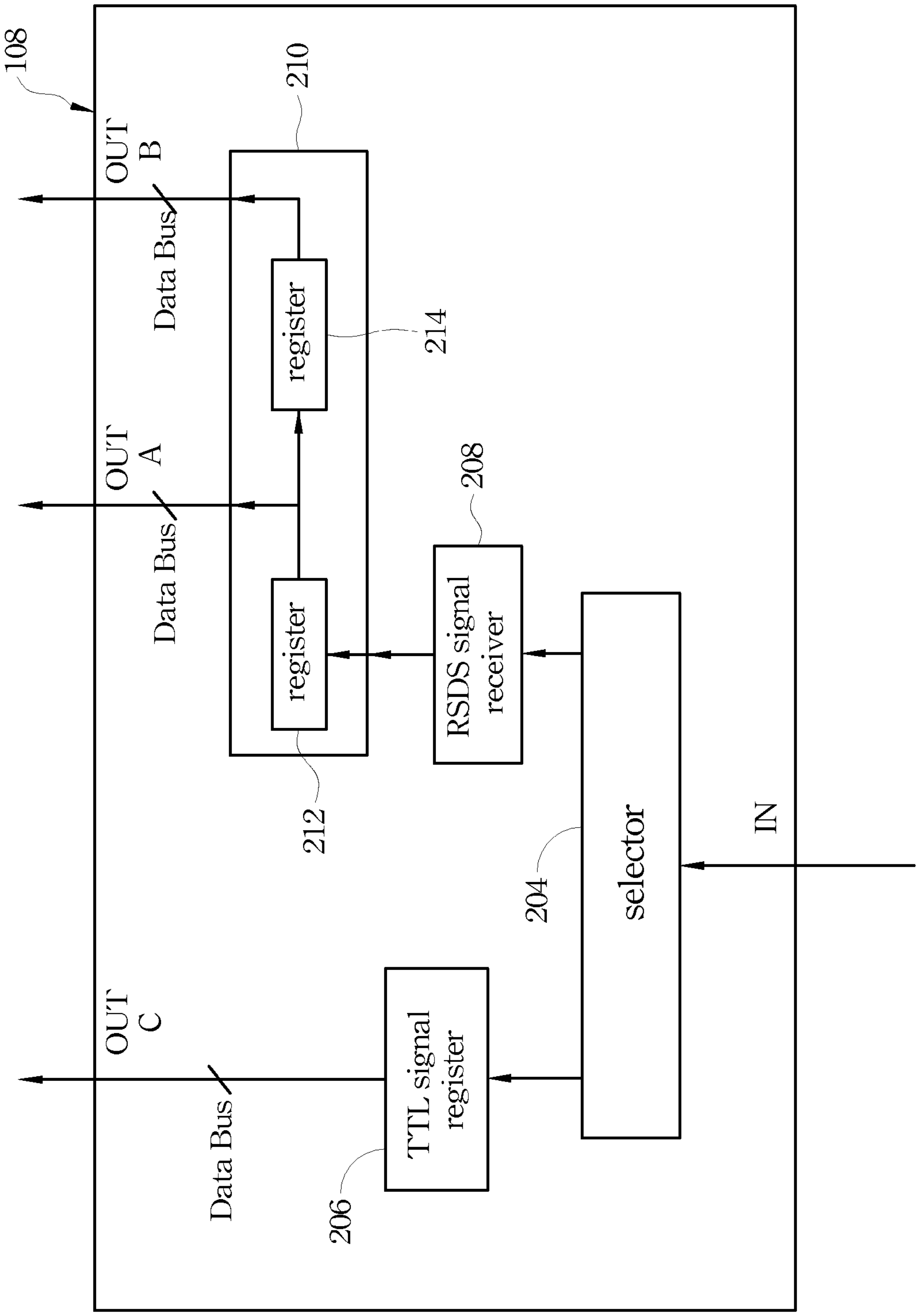
FIG. 2*b* illustrates the block diagram of a TTL/RSDS signal receiving circuit of a signal interface according to the preferred embodiment of the present invention.

Reference is made to FIG. 2*a* and FIG. 2*b* illustrating the block diagram of the TTL signal receiving circuit and the block diagram of the TTL/RSDS signal receiving circuit of the signal interface according to the preferred embodiment of the present invention, respectively. As shown in FIG. 2*a* and FIG. 2*b*, the TTL signal receiving circuit comprises a register 202, and the TTL/RSDS signal receiving circuit comprises a selector 204, a TTL signal register 206, a RSDS signal receiver 208 and a two-stage register 210. Moreover, the two-stage register 210 further comprises a register 212 and a register 214. The following describes the function and the operation method of each part.

In FIG. 2*a*, the register 202 receives and registers the TTL signal, and the TTL signal is then output to the source driving circuit via the data bus. In FIG. 2*b*, after the selector 204 receives the input signals, the selector 204 sends the TTL signal to the TTL signal register 206 or sends the RSDS signal to the RSDS signal receiver 208. The selector 204 may be a de-multiplexer. The TTL signal register 206 registers the TTL signal sent from the selector 204 and then transmits the TTL signal to the source driving circuit from the output C via the data bus, as shown in FIG. 2*b*.

The RSDS signal receiver 208 receives the RSDS signal sent from the selector 204 and converts the RSDS signal to the TTL signal. Then, the RSDS signal receiver 208 outputs the converted TTL signal. The register 212 in the two-stage register 210 receives and registers the converted TTL signal and pushes the data saved in the register 212 into the register 214 to allow the register 212 to save new data when the RSDS signal receiver 208 inputs the new TTL signal. Until a control signal is input, the two-stage register 210 simultaneously outputs the data saved in the register 212 and the register 214 to the data bus. In other words, the two-stage register 210 converts a set of serial-in data to two sets of parallel-out data by means of the register 212 and the register 214 and then outputs the data via the data bus from the output A and the output B, respectively.

If the data signal sent from the controller unit is the TTL signal, the TTL signal receiving circuits 106 and the TTL/RSDS signal receiving circuits 108 work together to have the register 202 and the selector 204 receive the TTL signal. The selector 204 further transmits the TTL signal to the TTL signal register 206 to make the data bus output the signals saved in the register 202 and the TTL signal register 206 to the source driver circuit. If the data signal sent from the controller unit is the RSDS signal, the TTL/RSDS signal receiving circuits 108 work to have the selector 204 receive the RSDS signal. The selector 204 further transmits the signal to the RSDS signal receiver 208 to convert the RSDS signal to the TTL signal and then outputs it to the register 210 which in turn outputs it to the source driver circuit via the data bus.

Hence, the TTL/RSDS signal receiving circuit of the signal interface in the preferred embodiment of the present invention can proceed different processes according to different kinds of input signals. If the input data is the TTL signal, then no process is proceeded and the data is output directly. If the input data is the RSDS signal, the RSDS signal receiver 208 converts the RSDS signal to the TTL signal, and the two-stage register 210 then re-arranges the data into two stages and outputs the data. Furthermore, the TTL signal receiving circuit may be replaced with the TTL/RSDS signal receiving circuit in other embodiments of the present invention.

Figure 3:
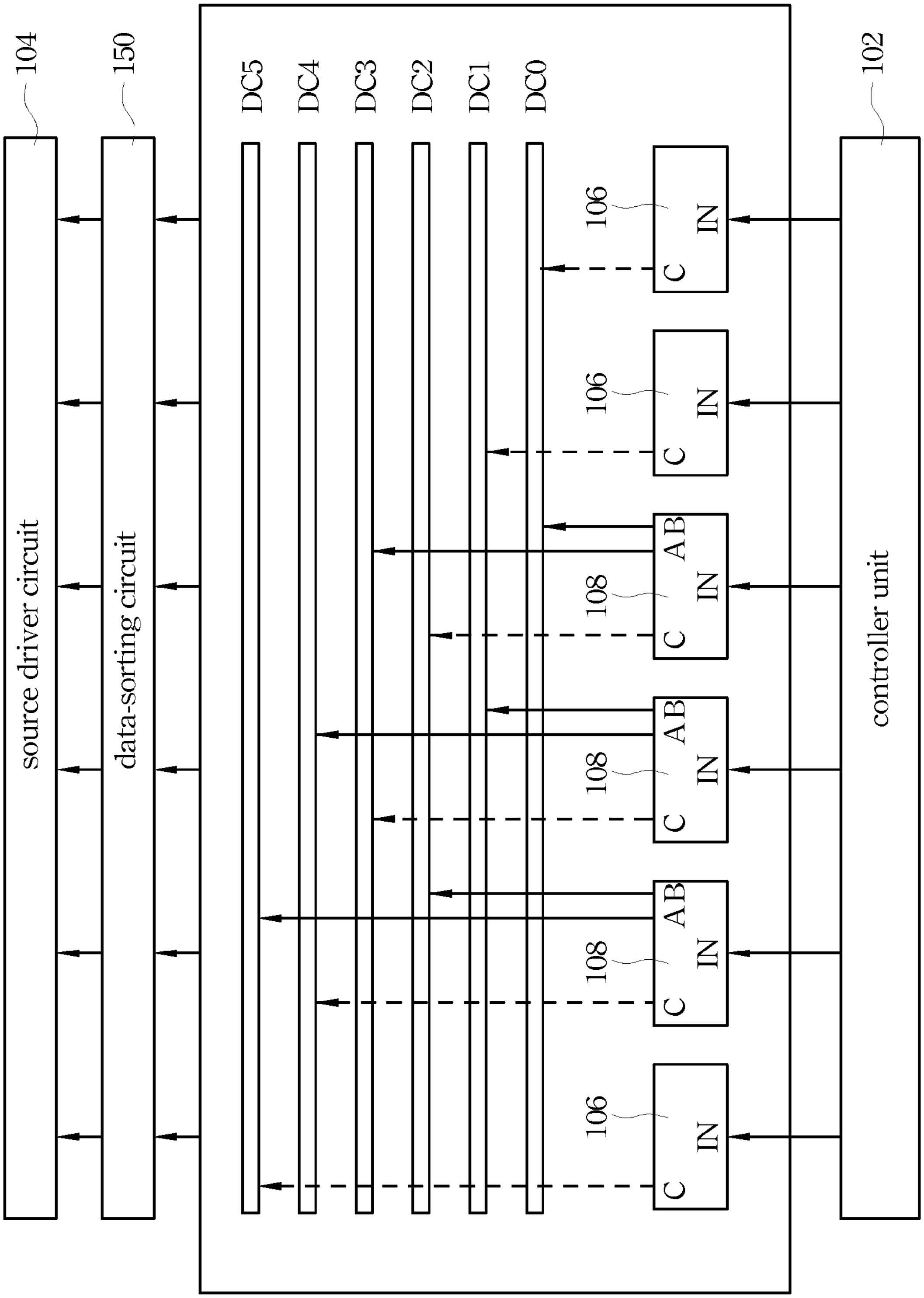
FIG. 3 illustrates a signal interface according to another preferred embodiment of the present invention.
Figure 4:
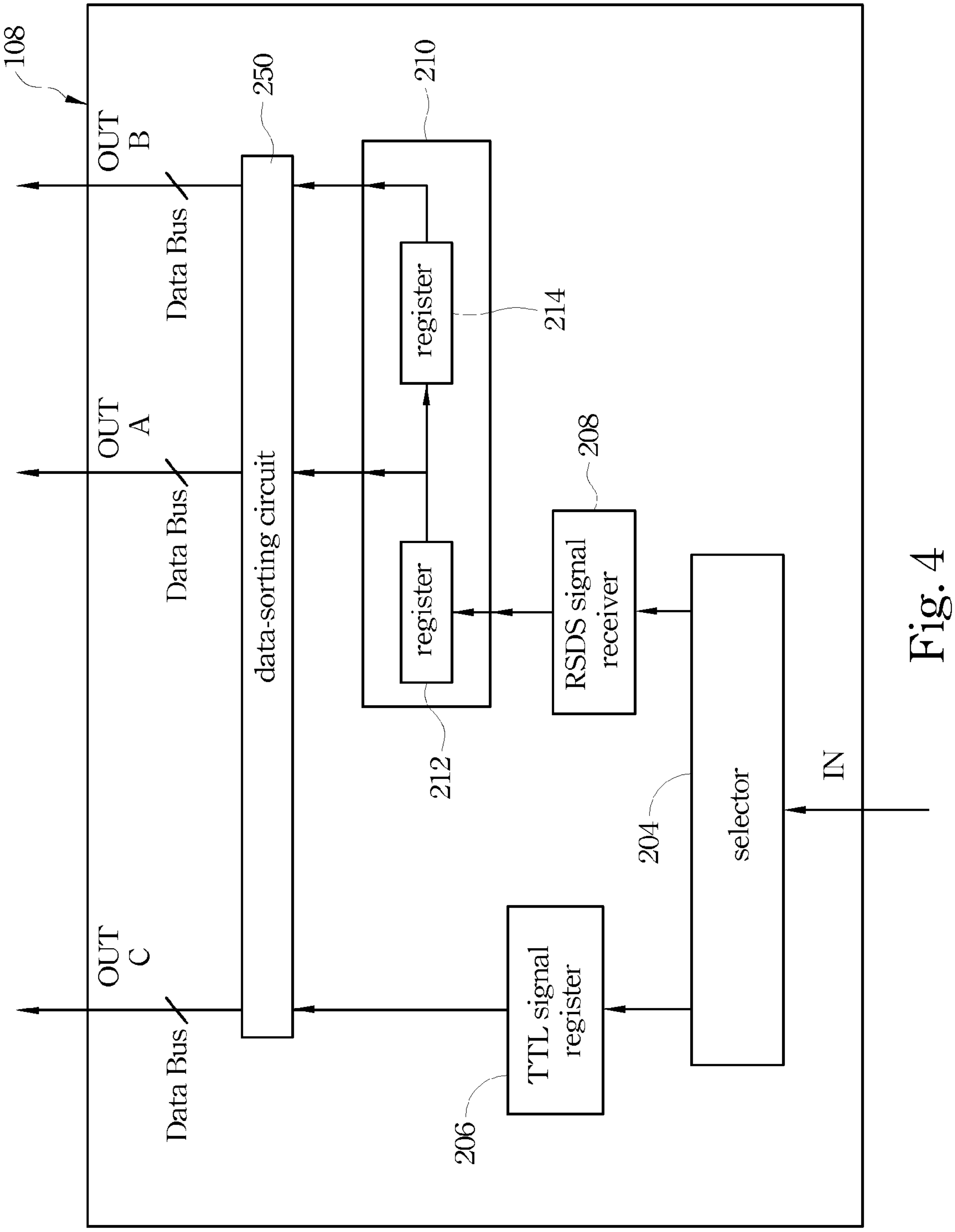
FIG. 4 illustrates the block diagram of a TTL/RSDS signal receiving circuit of a signal interface according to still another preferred embodiment of the present invention.

Reference is made to FIG. 3 illustrating a signal interface according to another preferred embodiment of the present invention. As shown in the drawing, the signal interface in FIG. 3 is an advanced version of that in FIG. 1. The difference between them is that the signal interface in FIG. 3 further comprises a data-sorting circuit 150 coupled between the data bus and the source driver circuit 104. In FIG. 3, after the signal received by the TTL/RSDS signal receiving circuits 108 is processed, it is sent to the data-sorting circuit 150, and the order of the data will be sorted according to a control signal (not shown) and then sent to the source driver circuit 104. Thus, the TTL/RSDS signal receiving circuits 108 can receive data in-different order and the source driver circuit 104 can still manage the data correctly; or the TTL/RSDS signal receiving circuits 108 can receive data in the same order and supply the source driver circuit 104 for different applications. Furthermore, the data-sorting circuit can be set between the TTL signal register 206 and the data bus or between the two-stage register 210 and the data bus in still another preferred embodiment of the present invention, as the data-sorting circuit 250 shown in FIG. 4. Furthermore, the data-sorting circuit 250 may just sort the data output from the TTL signal register 206, the register 212 or the register 214, or sort the data output from the arbitrary combination of these registers.

Hence, a feature of the present invention is that the TTL/RSDS signal receiving circuit of the signal interface distinguishes between the TTL signal and the RSDS signal according to the different input signals and determines if converting the signal before outputting the data is necessary.

Another feature of the present invention is that the TTL/RSDS signal receiving circuit of the signal interface not only can receive the RSDS signal but also can work with the TTL signal receiving circuit to receive the TTL signal, so the pins of the signal interface can be commonly used to receive signals and there is no need to design for other kinds of signals.

According to the aforementioned description, one advantage of the present invention is that the signal interface includes the TTL signal receiving circuit and the TTL/RSDS signal receiving circuit to receive the TTL signal and the RSDS signal; i.e. the TTL signal and the RSDS signal can commonly use part of the same circuit.

According to the aforementioned description, yet another advantage of the present invention is that the signal interface is electrically connected in the front of the driving circuit which makes the driving circuit receive the single-end signal and the serial signal and further reduces the complexity in manufacturing.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A signal interface, suitable for transmitting a data signal to a driving circuit, the signal interface comprising:

at least a first circuit, comprising:
a first register;
at least a second circuit, comprising:
a selector, for receiving the data signal;
a second register, electrically connected to the selector;
a receiver, electrically connected to the selector; and
a third register, electrically connected to the receiver; and
at least a data bus, electrically connected to the first register, the second register and the third register, the data bus transmitting the signal output from the first register, the second register and the third register to the driving circuit;
wherein if the data signal is a first single-end signal, the first register and the selector receive the data signal, and the selector further transmits the data signal to the second register to make the data bus transmit the signal saved in the first register and the second register to the driving circuit, and if the data signal is a serial signal, the selector receives and transmits the data signal to the receiver to have the data signal transferred to a second single-end signal and transmitted to the third register and then output to the driving circuit via the data bus.

2. The signal interface according to claim 1, wherein the selector is a de-multiplexer.

3. The signal interface according to claim 1, wherein the first single-end signal is a transistor-transistor logic (TTL) signal.

4. The signal interface according to claim 1, wherein the second single-end signal is a transistor-transistor logic signal.

5. The signal interface according to claim 1, wherein the serial signal is a differential signal.

6. The signal interface according to claim 1, wherein the third register is a two-stage register used for converting the second single-end signal from serial-in to parallel-out.

7. The signal interface according to claim 1, further comprising a data-sorting circuit coupled between the third register and the data bus.

8. The signal interface according to claim 1, further comprising a data-sorting circuit coupled between the data bus and the driving circuit.

9. A signal receiving circuit, comprising:

a selector, for receiving a data signal wherein the data signal is a first single-end signal or a differential signal;
a first register, electrically connected to the selector, the first register registering and outputting the first single-end signal;
a differential signal receiver, electrically connected to the selector, the differential signal receiver converting the differential signal to a second single-end signal; and
a second register, electrically connected to the differential signal receiver, the second register registering and outputting the second single-end signal.

10. The signal receiving circuit according to claim 9, wherein the selector is a de-multiplexer.

11. The signal receiving circuit according to claim 9, wherein the first single-end signal is a transistor-transistor logic signal.

12. The signal receiving circuit according to claim 9, wherein the second single-end signal is a transistor-transistor logic signal.

13. The signal receiving circuit according to claim 9, wherein the differential signal is a reduced swing differential signal (RSDS).

14. The signal receiving circuit according to claim 9, wherein the second register is a two-stage register used for converting the second single-end signal from serial-in to parallel-out.

15. The signal receiving circuit according to claim 9, further comprising a data-sorting circuit coupled to the second register.

16. The signal receiving circuit according to claim 9, wherein the signal receiving circuit further couples to a data bus to form a signal interface to transmit the data signal to a driving circuit via the data bus.

17. The signal receiving circuit according to claim 16, further comprising a data-sorting circuit coupled between the data bus and the driving circuit.

18. An operation method of a signal interface, comprising:
receiving a data signal wherein the data signal is a first single-end signal or a first differential signal;
if the data signal is the first single-end signal, sending the first single-end signal to a first register and outputting the first single-end signal;
if the data signal is the first differential signal, converting the first differential signal to a second single-end signal;
sending the second single-end signal to a second register;
inputting a second differential signal and converting the second differential signal to a third single-end signal;
sending the third single-end signal to the second register; and
outputting the second single-end signal and the third single-end signal.

19. The operation method of a signal interface according to claim 18, wherein the step of sending the second single-end signal to the second register is to send the second single-end signal to a first stage register of the second register.

20. The operation method of a signal interface according to claim 19, further comprising sending the second single-end signal in the first stage register to a second stage register of the second register before the step of sending the third single-end signal to the second register.

21. The operation method of a signal interface according to claim 20, wherein the step of sending the third single-end signal to the second register is to send the third single-end signal to the first stage register of the second register.

22. The operation method of a signal interface according to claim 18, wherein the first single-end signal is a transistor-transistor logic signal.

23. The operation method of a signal interface according to claim 18, wherein the second single-end signal is a transistor-transistor logic signal.

24. The operation method of a signal interface according to claim 18, wherein the third single-end signal is a transistor-transistor logic signal.

25. The operation method of a signal interface according to claim 18, wherein the first differential signal is a reduced swing differential signal.

26. The operation method of a signal interface according to claim 18, wherein the second differential signal is a reduced swing differential signal.

27. The operation method of a signal interface according to claim 18, wherein the step of receiving the data signal is executed in a selector.

28. The operation method of a signal interface according to claim 18, wherein the step of converting the first differential signal to the second single-end signal is executed in a differential signal receiver.

29. The operation method of a signal interface according to claim 18, further comprising the step of sorting the data signal wherein the data signal is selected from the group consisting of the first single-end signal, the second single-end signal and the third single-end signal.

* * * * *